United States Patent
Yamamoto (10) Patent No.: US 10,167,053 B2
(45) Date of Patent: Jan. 1, 2019

(54) BICYCLE DRIVE UNIT

(71) Applicant: Shimano Inc., Sakai, Osaka (JP)

(72) Inventor: Takashi Yamamoto, Osaka (JP)

(73) Assignee: Shimano Inc., Osaka (JP)

( * ) Notice: Subject to any disclaimer, the term of this patent is extended or adjusted under 35 U.S.C. 154(b) by 85 days.

(21) Appl. No.: 15/345,387

(22) Filed: Nov. 7, 2016

(65) Prior Publication Data

US 2017/0152001 A1  Jun. 1, 2017

(30) Foreign Application Priority Data

Nov. 27, 2015 (JP) .................................. 2015-231987

(51) Int. Cl.
*B62M 6/55* (2010.01)
*B62M 11/06* (2006.01)
*F16H 3/10* (2006.01)

(52) U.S. Cl.
CPC .............. *B62M 6/55* (2013.01); *B62M 11/06* (2013.01); *F16H 3/10* (2013.01)

(58) Field of Classification Search
CPC .............. B62M 6/40; B62M 6/55; F16H 3/10
See application file for complete search history.

(56) References Cited

U.S. PATENT DOCUMENTS

| | | | | |
|---|---|---|---|---|
| 5,749,429 A | * | 5/1998 | Yamauchi ................ | B62M 6/45 180/206.2 |
| 5,758,736 A | * | 6/1998 | Yamauchi ................ | B62M 6/45 180/206.4 |
| 6,012,538 A | * | 1/2000 | Sonobe .................... | B62M 6/45 180/206.3 |
| 6,073,717 A | * | 6/2000 | Yamamoto ............... | B62M 6/45 180/206.4 |
| 6,080,073 A | * | 6/2000 | Liu .......................... | B62M 6/55 180/206.1 |
| 8,652,000 B2 | * | 2/2014 | Wang ...................... | B62M 6/55 477/5 |

(Continued)

FOREIGN PATENT DOCUMENTS

| | | |
|---|---|---|
| JP | 2623419 B2 | 6/1997 |
| JP | 4056130 B2 | 3/2008 |

(Continued)

*Primary Examiner* — Kevin Hurley
*Assistant Examiner* — Michael R Stabley
(74) *Attorney, Agent, or Firm* — Global IP Counselors, LLP (57) ABSTRACT

A bicycle drive unit has a transmission and a motor that transmits torque to the transmission. The transmission includes first and second input side rotating bodies, first and second output side rotating bodies, an output unit and a switching mechanism. The first and second output side rotating bodies are coupled to the first and second input side rotating bodies, respectively. The switching mechanism switches between a first state in which rotation of the first input side rotating body is transmitted to the output unit, and a second state in which rotation of the second input side rotating body is transmitted to the output unit. Only torque of the motor is transmitted from the first and second input side rotating bodies to the output unit, while torque outputted from the output unit merges with a manual drive force in a drive force transmission path from the output unit to a wheel.

16 Claims, 4 Drawing Sheets

(56) References Cited

U.S. PATENT DOCUMENTS

| | | | | |
|---|---|---|---|---|
| 8,684,122 | B2* | 4/2014 | Maeno | B62M 6/55 |
| | | | | 180/205.1 |
| 8,777,791 | B1* | 7/2014 | Hino | B62M 6/55 |
| | | | | 180/206.4 |
| 9,017,201 | B2* | 4/2015 | Hino | B62M 11/04 |
| | | | | 475/5 |
| 9,758,213 | B2* | 9/2017 | Kawakami | B62M 6/55 |
| 2011/0195813 | A1* | 8/2011 | Yoo | B62M 11/16 |
| | | | | 475/270 |
| 2014/0051548 | A1* | 2/2014 | Hino | B62M 6/55 |
| | | | | 477/15 |
| 2014/0121049 | A1* | 5/2014 | Nishikawa | B62M 6/55 |
| | | | | 474/148 |
| 2016/0107721 | A1* | 4/2016 | Urabe | B62M 6/55 |
| | | | | 475/4 |
| 2016/0167733 | A1* | 6/2016 | Kawakami | B62M 6/50 |
| | | | | 180/220 |
| 2016/0280321 | A1* | 9/2016 | Yamamoto | F16H 3/083 |
| 2016/0280328 | A1* | 9/2016 | Yamamoto | B62M 11/14 |
| 2016/0288872 | A1* | 10/2016 | Shahana | B62M 6/55 |

FOREIGN PATENT DOCUMENTS

| | | | | |
|---|---|---|---|---|
| JP | 6523636 | B1 | 6/2014 | |
| WO | WO-2015008314 | A1 * | 1/2015 | B62M 6/50 |

* cited by examiner

BICYCLE DRIVE UNIT

CROSS-REFERENCE TO RELATED APPLICATIONS

This application claims priority to Japanese Patent Application No. 2015-231987, filed on Nov. 27, 2015.The entire disclosure of Japanese Patent Application No. 2015-231987 is hereby incorporated herein by reference.

BACKGROUND

Field of the Invention

The present invention relates to a bicycle drive unit.

Background Information

Some bicycles are provided with a bicycle drive unit to assist the rider by generating an auxiliary drive force. A bicycle drive unit comprises a motor for assisting the manual drive force. In addition to the motor, the bicycle drive unit often further comprises a reduction gear that decelerates and outputs the rotation of the motor, an output unit to which rotation is transmitted from each of the reduction gear and a crankshaft, and the like. One example of such a conventional bicycle drive unit is disclosed in Japanese Patent No. 2,623,419.

SUMMARY

Generally, the present disclosure is directed to various features of a bicycle drive unit. In a conventional bicycle drive unit, the rotational speed of the motor is proportional to the rotational speed of the crank. Since the motor has a characteristic in which the output torque varies according to the rotational speed, there is the risk that the output torque of the motor will be insufficient, thereby reducing the assisting force, depending on the rotational speed of the crank.

One object of the present invention is to provide a bicycle drive unit that can prevent a reduction in the assisting force accompanying a change in the rotational speed of the crank.

In view of the state of the known technology and in accordance with a first aspect of the present disclosure, a bicycle drive unit according to the present invention comprises a transmission having a plurality of gear shift stages and a motor configured to transmit torque to the transmission. The transmission comprises a first input side rotating body, a second input side rotating body, a first output side rotating body, a second output side rotating body, an output unit and a switching mechanism. The second input side rotating body is rotatably disposed around a first rotational axis. The first output side rotating body is rotatably disposed around a second rotational axis that is parallel to the first rotational axis and is coupled to the first input side rotating body. The second output side rotating body is rotatably disposed around the second axis and is coupled to the second input side rotating body. The output unit is configured to receive rotation of the first output side rotating body and the second output side rotating body. The switching mechanism is configured to switch between a first state in which the rotation of the first input side rotating body is transmitted to the output unit, and a second state in which the rotation of the second input side rotating body is transmitted to the output unit. The output unit is configured to receive only torque of the motor being transmitted from the first input side rotating body and the second input side rotating body to the output unit. The output unit is configured such that torque that is output from the output unit merges with a manual drive force in a drive force transmission path from the output unit to a wheel.

According to one example of the bicycle drive unit, the output unit includes a crankshaft.

According to one example of the bicycle drive unit, the output unit includes a hollow shaft configured to receive a crankshaft therein.

One example of the bicycle drive unit further comprises the crankshaft being coupled to the output unit.

According to one example of the bicycle drive unit, the first input side rotating body and the second input side rotating body are gears having different diameters. The first output side rotating body is a gear that is engaged with the first input side rotating body. The second output side rotating body is a gear that is engaged with the second input side rotating body.

One example of the bicycle drive unit further comprises a first rotational shaft that rotates on the first rotational axis. The first output side rotating body and the second output side rotating body are fixed to the output unit. The switching mechanism is configured to switch between a first state and a second state. The switching mechanism integrally rotates the first rotational shaft and the first input side rotating body together as a unit and rotates the first rotational shaft relative to the second input side rotating body while the switching mechanism is in the first state. The switching mechanism integrally rotates the first rotational shaft and the second input side rotating body as a unit and rotates the first rotational shaft relative to the first input side rotating body while the switching mechanism is in the second state.

According to one example of the bicycle drive unit, a rotational speed ratio of the first output side rotating body with respect to a rotational speed of the first input side rotating body is configured to be smaller than a rotational speed ratio of the second output side rotating body with respect to a rotational speed of the second input side rotating body. The switching mechanism comprises a connection switching unit and a one-way clutch. The connection switching unit is configured to couple the first rotational shaft and the second input side rotating body while the switching mechanism is in the first state and allow a relative rotation between the first rotational shaft and the second input side rotating body while the switching mechanism is in the second state. The one-way clutch is provided between the first rotational shaft and the first input side rotating body.

According to one example of the bicycle drive unit, the one-way clutch is configured to integrally rotate the first rotational shaft and the first input side rotating body while the rotational speed of the first input side rotating body in a first rotational direction is equal to the rotational speed of the first rotational shaft. The one-way clutch is configured to rotate the first rotational shaft relative to the first input side rotating body while the rotational speed of the first input side rotating body in the first rotational direction is greater than the rotational speed of the first rotational shaft.

According to one example of the bicycle drive unit, the connection switching unit comprises a pawl and an engagement portion. The pawl is provided on and protruding from one of the first rotational shaft and the second input side rotating body. The engagement portion is provided to the other of the first rotational shaft and the second input side rotating body so that the pawl is configured to selectively engage the engagement portion. The first rotational shaft and the second input side rotating body are coupled by the pawl engaging the engagement portion, and permitting rotation of the first rotational shaft with respect to the second input side rotating body by disengaging the pawl from the engagement portion.

According to one example of the bicycle drive unit, the switching mechanism further comprises an actuator configured to control the connection switching unit.

According to one example of the bicycle drive unit, the actuator comprises a biasing member, a movable member and a drive unit. The biasing member applies a force to the pawl so that the pawl projects from one of the first rotational shaft and the second input side rotating body. The movable member that is configured to cause the pawl to operate with respect to the other of the first rotational shaft and the second input side rotating body so that the pawl moves away from the engagement portion. The drive unit switches between the first state and the second state by moving the movable member.

According to one example of the bicycle drive unit, the first rotational shaft is inserted in holes provided in each of the first input side rotating body and the second input side rotating body.

According to one example of the bicycle drive unit, the pawl is disposed between an outer perimeter of the first rotational shaft and an inner perimeter of the second input side rotating body.

One example of the bicycle drive unit further comprises a speed reducer configured to reduce a rotational speed of the motor and transmit the rotational speed of the motor to the transmission.

According to one example of the bicycle drive unit, the motor is partially is disposed on a plane as at least that includes one of the first input side rotating body and the second input side rotating body. The plane is perpendicular to the first rotational axis and the second rotational axis.

According to one example of the bicycle drive unit, the first output side rotating body and the second output side rotating body are integrally formed together as a unit.

The bicycle drive unit of the present invention is configured to prevent a reduction in the assisting force accompanying a change in the rotational speed of the crank.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

An electrically assisted bicycle 10 shown in FIG. 1 comprises a bicycle drive unit (hereinafter referred to as "drive unit 30") in accordance with a first embodiment. In one example, the electrically assisted bicycle 10 further comprises a pair of crank arms 12, a pair of pedals 16, a front sprocket 18, a rear sprocket 20, a chain 22 and a first clutch 24.

The crank arms 12 are coupled to the opposite ends of a crankshaft 32 in a state of being integrally rotatable with the crankshaft 32 of the drive unit 30. The crank arms 12 together with the crankshaft 32 form a crank. The pedals 15 each comprises a pedal main body 17 and a pedal shaft 14. The pedal shafts 14 are coupled to the crank arms 12, respectively. The pedal main bodies 17 are supported on the pedal shafts 14, respectively, in a state of being rotatable with respect to the pedal shafts 14.

The front sprocket 18 is coupled with the drive unit 30 via an output unit 58 of the drive unit 30. The rear sprocket 20 is coupled with a rear wheel (not shown) of the electrically assisted bicycle 10 via the first clutch 24. The first clutch 24 is a one-way clutch that transmits the rotation of the front sprocket 18 to the rear wheel and that does not transmit the rotation of the rear wheel to the front sprocket 18. The chain 22 is engaged with the front sprocket 16 and the rear sprocket 20.

The function of the drive unit 30 is to assist the manual drive force that is inputted to the crankshaft 32. The drive unit 30 is mounted on a frame of the electrically assisted bicycle 10 and is detachable with respect to the frame. An example of a means to join the drive unit 30 and the frame are bolts. A battery (not shown) is mounted on the frame of the electrically assisted bicycle 10. The battery (not shown) is configured to supply electrical energy to the drive unit 30.

Figure 2:
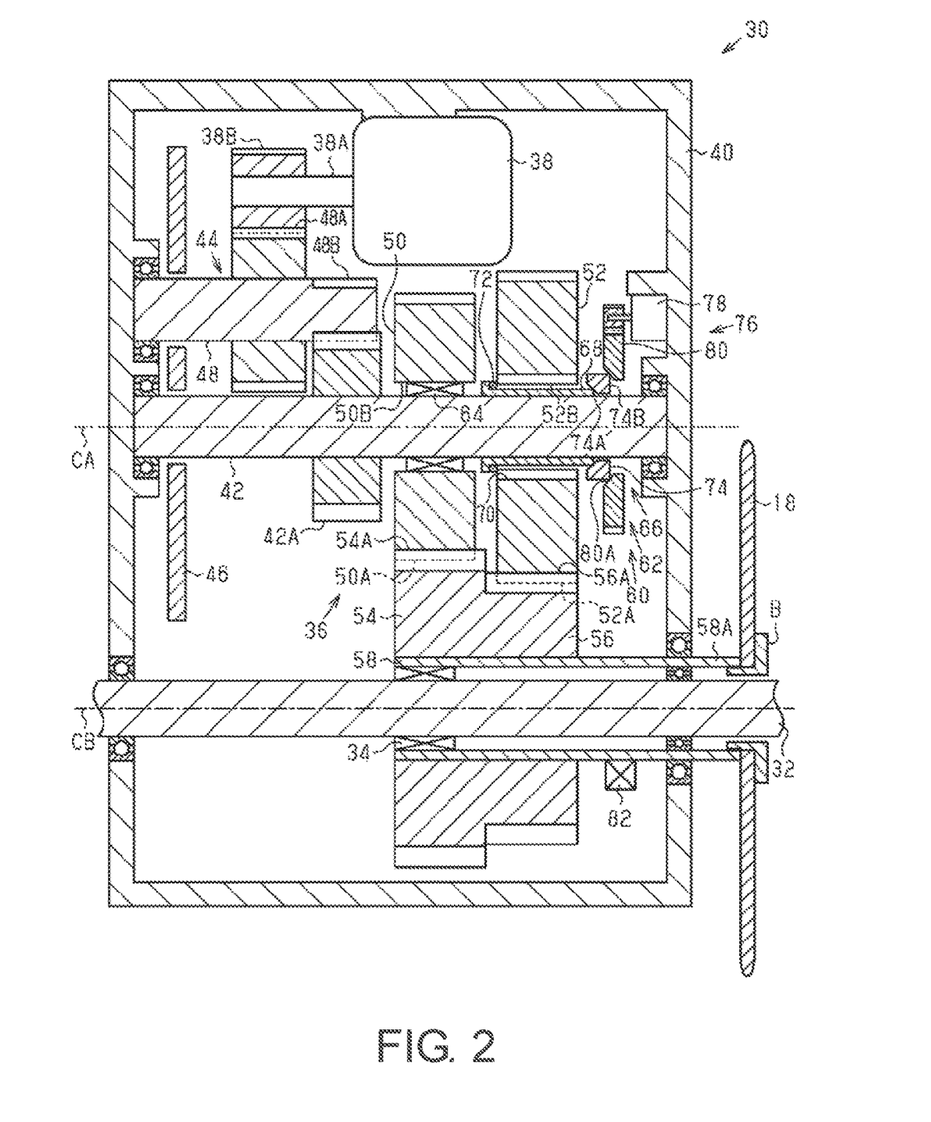
FIG. 2 is a cross-sectional view of the bicycle drive unit as seen along section line 2-2 in FIG. 1, when the switching mechanism is in the first state.

As shown in FIG. 2, the drive unit 30 comprises a transmission 36 and a motor 38. One example of a motor 38 is an electric motor. In one example, the drive unit 30 further comprises a crankshaft 32, a second clutch 34, a housing 40, a first rotational shaft 42, a speed reducer 44 and a controller 46.

The crankshaft 32 is supported by the drive unit 30 in a state of being rotatable with respect to the drive unit 30. Both ends of the crankshaft 32 protrude from the housing 40. The transmission 36, the motor 38, the crankshaft 32, the second clutch 34, the housing 40, the first rotational shaft 42, the speed reducer 44 and the controller 46 are provided in the housing 40. The controller 46 is programmed to execute a control program that is set in advance. The controller 46 comprises a processor, for example, a CPU (Central Processing Unit) or an MPU (Micro Processing Unit). The controller 46 preferably includes a memory device for storing programs and data.

The crankshaft 32 is coupled to the output unit 58 of the transmission 36 via the second clutch 34. One end 58A of the output unit 58 protrudes from the housing 40. The crankshaft 32 is inserted in the output unit 58 so that both ends protrude from the output unit 58 and the housing 40. The crankshaft 32 is supported in the housing 40 via the output unit 58.

The second clutch 34 is provided between the outer perimeter of the crankshaft 32 and the inner perimeter of the output unit 58. The second clutch is a one-way clutch. The second clutch 34 transmits rotation from the crankshaft 32 to the output unit 58 while the crankshaft 32 is rotated forward. The second clutch 34 is coupled with the crankshaft 32 and the output unit 58 so as to not transmit rotation from the crankshaft 32 to the output unit 58 while the crankshaft 32 is rotated rearward.

The front sprocket 18 is arranged on the side of the housing 40 and located outside of the housing 40. The front sprocket 18 is attached to the drive unit 30 by a bolt B. The bolt B is threaded to the output unit 58 so as to fix the front sprocket 18 between the output unit 58 and the bolt B.

Figure 1:
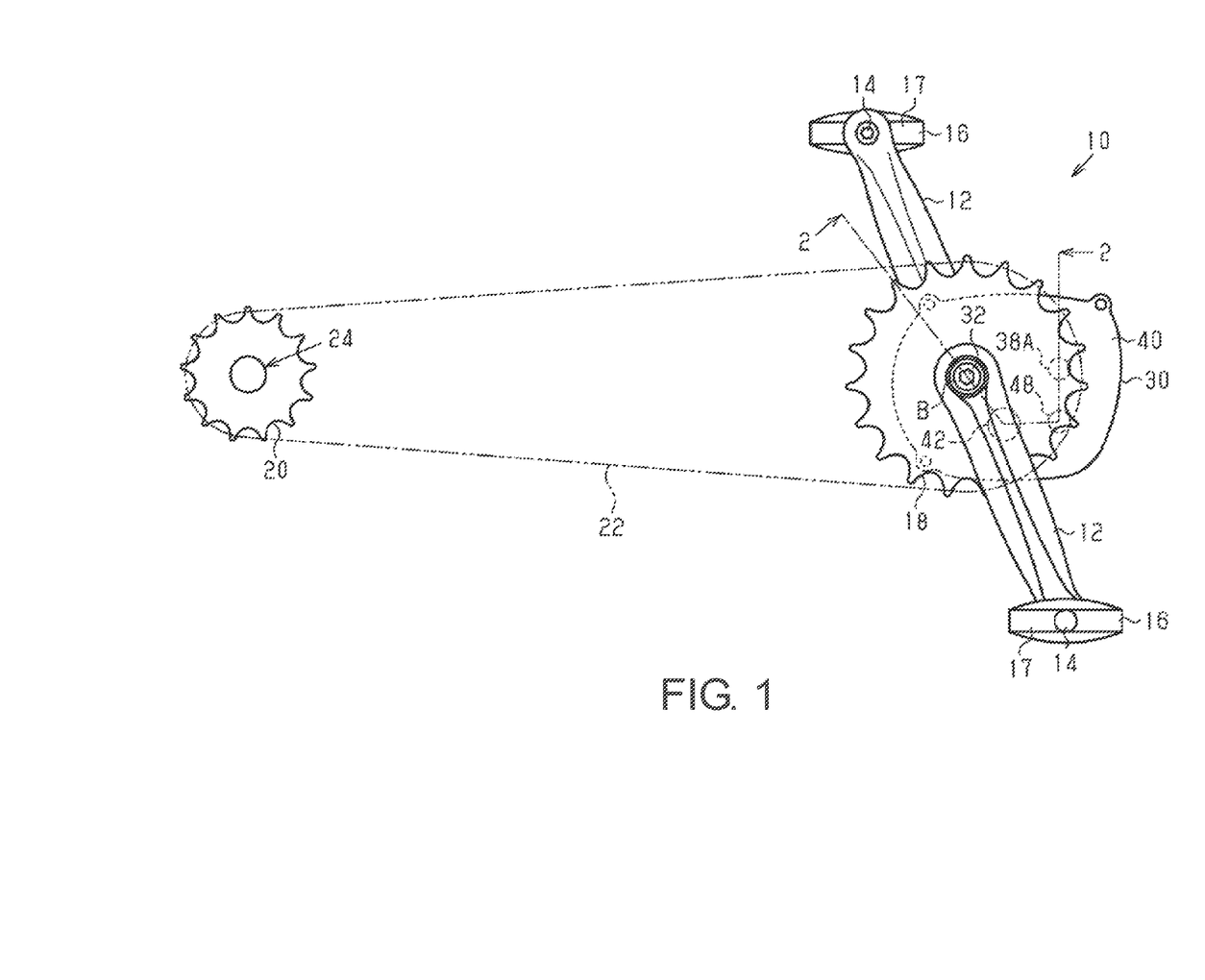
FIG. 1 is a side elevational view of a drivetrain of an electrically assisted bicycle equipped with a bicycle drive unit in accordance with a first embodiment.

When a manual drive force is inputted to the pedals 16 in a forward direction to rotate the crankshaft 32 as shown in FIG. 1, the crankshaft 32 is also rotated forward with respect to the frame of the electrically assisted bicycle 10. In this case, the rotation of the crankshaft 32 is transmitted to the front sprocket 18 via the second clutch 34 and the output unit 58, and the rotation of the front sprocket 18 is transmitted to the rear sprocket 20 via the chain 22. When a manual drive force is inputted to the pedals 16 in a rearward direction to rotate the crankshaft 32, the crankshaft 32 is also rotated rearward with respect to the frame. In this case, the rotation of the crankshaft 32 is not transmitted to the output unit 58 and the front sprocket 18 by the action of the second clutch 34.

As shown in FIG. 2, the speed reducer 44 is configured to reduce the rotational speed of the motor 38 and transmits the rotation of the motor 38 to the transmission 36. The speed reducer 44 comprises a first rotational shaft 42 and a second rotational shaft 48. The first rotational shaft 42 rotates on a first rotational axis CA. The first rotational shaft 42 is rotatably supported in the housing 40. The first rotational shaft 42 is supported in the housing 40 via a plurality of bearings provided at intervals along the axial direction. The first rotational axis CA is provided away from a second rotational axis CB and parallel to the second rotational axis CB. The second rotational shaft 48 is rotatably supported in the housing 40 and provided in a position adjacent to the output shaft 38A of the motor 38. The second rotational shaft 48 is provided parallel to the first rotational shaft 42 and away from the first rotational shaft 42. The second rotational shaft 48 is rotatably supported in the housing 40 via a plurality of bearings provided at intervals in the axial direction.

The motor 38 is configured to transmit torque to the transmission 36. The motor 38 is partially disposed on the same plane as at least one of the first input side rotating body 50 and the second input side rotating body 52. This plane is perpendicular to the first rotational axis CA and the second rotational axis CB.

The speed reducer 44 further comprises a gear 38B, a first gear 48A, a second gear 48B and a gear 42A. The gear 38B is provided on the output shaft 38A of the motor 38. The first gear 48A and the second gear 48B are provided on the second rotational shaft 48. The gear 42A is provided on the first rotational shaft 42. The first gear 48A is coaxially arranged with the second rotational shaft 48, which is integrally rotated with the first gear 48A. The first gear 48A is engaged with the gear 38B. The total number of teeth of the gear 38B is less than the total number of teeth of the first gear 48A. Accordingly, the rotation of the motor 38 is decelerated and transmitted to the second rotational shaft 48. The second gear 48B is provided on a portion of the second rotational shaft 48 that is different from the portion to which is provided the first gear 48A. The second gear 48B is coaxial with the second rotational shaft 48 and fixed to the second rotational shaft 48. Thus, the second gear 48B integrally rotates with the second rotational shaft 48. The second gear 48B is engaged with the gear 42A. The total number of teeth of the second gear 48B is less than the total number of teeth of the gear 42A. Accordingly, the rotation of the second rotational shaft 48 is decelerated and transmitted to the first rotational shaft 42. The gear 38B can be formed integrally with the output shaft 38A of the motor 38, or can be formed separately and coupled thereto. At least one of the first gear 48A and the second gear 48B can be formed integrally with the second rotational shaft 48, or can be formed separately and coupled thereto. The gear 42A can be formed integrally with the first rotational shaft 42, or can be formed separately and coupled thereto.

The transmission 36 comprises a plurality of gear shift stages. The transmission 36 comprises a first input side rotating body 50, a second input side rotating body 52, a first output side rotating body 54, a second output side rotating body 56, an output unit 58 and a switching mechanism 60.

The first input side rotating body 50 and the second input side rotating body 52 are rotatably provided around the first rotational axis CA. The first input side rotating body 50 and the second input side rotating body 52 are provided adjacent to each other in the axial direction of the first rotational shaft 42. The first input side rotating body 50 and the second input side rotating body 52 are relatively rotatable. The first input side rotating body 50 comprises a gear 50A with a plurality of teeth formed on the outer perimeter thereof. The second input side rotating body 52 comprises a gear 52A with a plurality of teeth formed on the outer perimeter thereof. The first input side rotating body 50 and the second input side rotating body 52 include the gears 50A and 52A, respectively, that have different diameters. The diameter of the gear 50A is smaller than the diameter of the gear 52A. The total number of teeth of the gear 50A is less than the total number of teeth of the gear 52A. The first rotational shaft 42 is inserted in holes 50B and 52B that are respectively provided to the first input side rotating body 50 and the second input side rotating body 52.

The first output side rotating body 54 is rotatably provided around the second axis CB. The first output side rotating body 54 is coupled to the first input side rotating body 50. Specifically, the first output side rotating body 54 comprises a plurality of teeth on the outer perimeter. The first output side rotating body 54 is formed by a gear 54A that is engaged with the first input side rotating body 50. The gear 50A which forms the first input side rotating body 50 is engaged with a gear 54A which forms the first output side rotating body 54. Accordingly, when rotation from the first rotational shaft 42 is inputted to the first input side rotating body 50, the first output side rotating body 54 is rotated.

The second output side rotating body 56 is rotatably provided around the second axis CB. The second output side rotating body 56 is coupled to the second input side rotating body 52. Specifically, the second output side rotating body 56 comprises a plurality of teeth on the outer perimeter. The second output side rotating body 56 is formed by a gear 56A that is engaged with the second input side rotating body 52. The gear 52A which forms the second input side rotating body 52 is engaged with a gear 56A which forms the second output side rotating body 56. Accordingly, when rotation from the first rotational shaft 42 is inputted to the second input side rotating body 52, the second output side rotating body 56 is rotated.

The first output side rotating body 54 and the second output side rotating body 56 are integrally formed. The diameter of the gear 54A is larger than the diameter of the gear 56A. The total number of teeth of the gear 54A is greater than the total number of teeth of the gear 56A. Accordingly, the ratio of the rotational speed of the first output side rotating body 54 relative to the rotational speed of the first input side rotating body 50 is configured to be greater than the ratio of the rotational speed of the second output side rotating body 56 relative to the rotational speed of the second input side rotating body 52.

The output unit 58 is a hollow shaft. The crankshaft 32 is disposed inside the output unit 58. The output unit 58 is provided in the housing 40 so as to be rotatable around the second axis CB. The first output side rotating body 54 and the second output side rotating body 56 are non-rotatably provided on the outer perimeter of the output unit 58 by, for example, spline fitting, press fitting, or the like. The first output side rotating body 54 and the second output side rotating body 56 can be integrally formed with the output unit 58 during the formation of the output unit 58. The first output side rotating body 54 and the second output side rotating body 56 are fixed to the output unit 58. Accordingly, the rotation of the first output side rotating body 54 and the rotation of the second output side rotating body 56 are selectively transmitted to the output unit 58.

The switching mechanism 60 comprises a connection switching unit 62, a one-way clutch 64 and an actuator 66. The switching mechanism 60 is configured to switch between a first state and a second state. In the first state, the rotation of the first input side rotating body 50 is transmitted to the output unit 58. In second state, the rotation of the second input side rotating body 52 is transmitted to the output unit 58. The switching mechanism 60 causes the first rotational shaft 42 and the first input side rotating body 50 to be integrally rotatable, and causes the first rotational shaft 42 and the second input side rotating body 52 to be relatively rotatable, in the first state. The switching mechanism 60 causes the first rotational shaft 42 and the second input side rotating body 52 to be integrally rotatable, and causes the first rotational shaft 42 and the first input side rotating body 50 to be relatively rotatable, in the second state.

The connection switching unit 62 connects the first rotational shaft 42 and the second input side rotating body 52 in the second state, and permits a relative rotation of the first rotational shaft 42 and the second input side rotating body 52 in the first state. The connection switching unit 62 comprises a plurality of pawl 68 and a plurality of engagement portion 70. Preferably, a plurality of the pawls 68 and a plurality of the engagement portions 70 are provided. However, only one of the pawls 68 and one of the engagement portions 70 can be provided. The pawls 68 are disposed between the outer perimeter of the first rotational shaft 42 and the inner perimeter of the second input side rotating body 52. The pawls 68 can protrude from the first rotational shaft 42. The engagement portion 70 is provided so that the pawls 68 is engaged with the second input side rotating body 52. The connection switching unit 62 connects the first rotational shaft 42 and the second input side rotating body 52 the pawls 68 engaging the engagement portions 70. The connection switching unit 62 permits a relative rotation of the first rotational shaft 42 and the second input side rotating body 52 by separating the pawls 68 from the engagement portions 70. The engagement portions 70 comprises one or a plurality of recesses and/or protrusions. The engagement portions 70 can be formed by a ratchet groove.

The actuator 66 controls the connection switching unit 62. The actuator 66 comprises a biasing member 72, a movable member 74 and a drive unit 76.

The biasing member 72 applies force to the pawls 68 so that the pawls 68 protrude from the first rotational shaft 42. The biasing member 72 is, for example, an annular spring, that is attached to the outer perimeter part of the first rotational shaft 42 so as to cover a part of the pawls 68.

The movable member 74 is configured to cause the pawls 68 to operate with respect to the second input side rotating body 52 so that the pawls 68 move away from the engagement portions 70. The movable member 74 is an annular member that is supported in the housing 40 around the first rotational shaft 42 so as to be relatively rotatable with the first rotational shaft 42. The movable member 74 is provided in a position in which the first end surface 74A thereof in the axial direction opposes the pawls 68. The first end surface 74A is formed in a tapered shape in which the diameter increases toward the pawls 68. The movable member 74 is biased in a direction away from the pawls 68 in the axial direction by, for example, a spring.

The drive unit 76 switches between the first state and the second state by moving the movable member 74. The drive unit 76 comprises a shifting motor 78 and an annular member 80. The annular member 80 is supported in the housing 40 around the first rotational shaft 42 so as to be relatively rotatable with respect to the first rotational shaft 42. The annular member 80 comprises a cam surface 80A on an end face in the axial direction. The movable member 74 is in contact with the cam surface 80A of the annular member 80.

The cam surface 80A is configured to come in contact with a second end 74B of the movable member 74 in the axial direction. The annular member 80 is connected to the shifting motor 78 and can be rotated by the shifting motor 78. When the annular member 80 is rotated by the drive of the shifting motor 78, the movable member 74 is moved in a direction approaching the pawls 68, or in a direction away from the pawls 68, depending on the rotational direction of the annular member.

The one-way clutch 64 is provided between the first rotational shaft 42 and the first input side rotating body 50. The one-way clutch 64 integrally rotates the first rotational shaft 42 and the first input side rotating body 50 when the rotational speed of the first input side rotating body 50 in the first rotational direction is equal to the rotational speed of the first rotational shaft 42. The one-way clutch 64 allows relative rotation of the first rotational shaft 42 and the first input side rotating body 50 when the rotational speed of the first input side rotating body 50 in the first rotational direction is greater than the rotational speed of the first rotational shaft 42. When the second state is formed by the connection switching unit 62, the rotation of the second input side rotating body 52 is transmitted to the second output side rotating body 56. In this case, the rotational speeds of the output unit 58 and of the first output side rotating body 54 are higher than when the rotation of the first input side rotating body 50 is transmitted to the first output side rotating body 54. Accordingly, the rotation of the first output side rotating body 54 rotates the first input side rotating body 50 at a higher speed than the first rotational shaft 42. Accordingly, the rotational speed of the first input side rotating body 50 becomes higher than the rotational speed of the first rotational shaft 42, and the first input side rotating body 50 and the first rotational shaft 42 are allowed to relatively rotate by the one-way clutch 64. The first rotational direction is the rotational direction of the first input side rotating body 50 when the electrically assisted bicycle 10 moves forward.

As shown in FIG. 2, when the movable member 74 approaches the pawls 68 and is rotating the pawls 68 around the first rotational shaft 42, the pawls 68 are spaced away from the engagement portions 70. Accordingly, relative rotation of the first rotational shaft 42 and the second input side rotating body 52 is permitted. Accordingly, the rotational speed of the first rotational shaft 42 is changed according to the ratio of the total number of teeth of the gear 50A of the first input side rotating body 50 relative to the total number of teeth of the gear 54A of the first output side rotating body 54. The total number of teeth of the gear 50A is less than the total number of teeth of the gear 54A.

Figure 3:
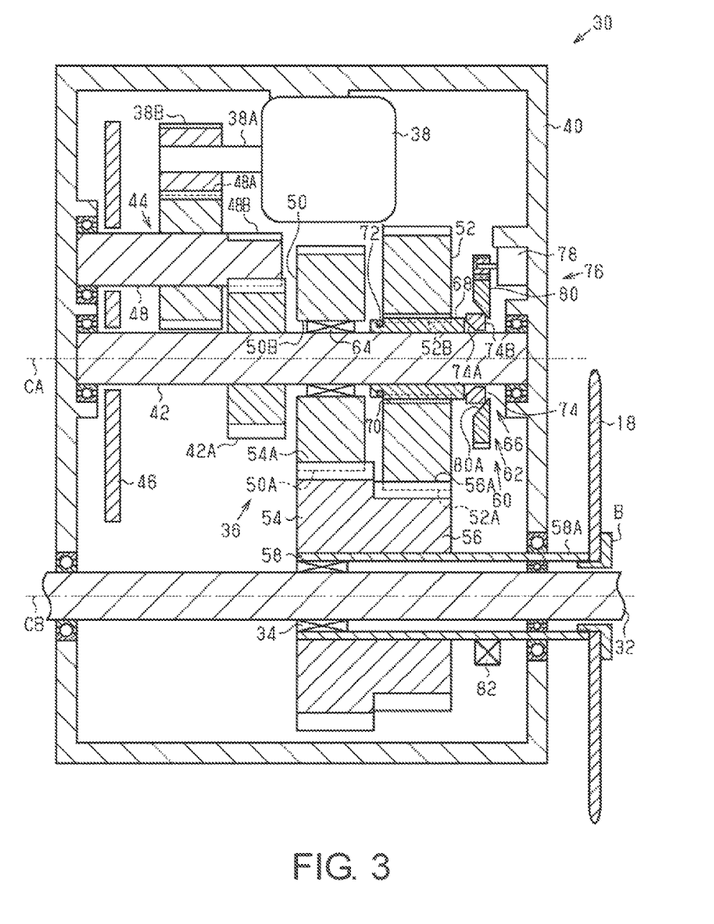
FIG. 3 is a cross-sectional view of the bicycle drive unit as seen along section line 2-2 in FIG. 1, when the switching mechanism is in the second state.

As shown in FIG. 3, when the movable member 74 is spaced away from the pawls 68, the pawls 68 protrude toward the engagement portions 70 by the biasing member 72. At this time, since the pawls 68 are engaged with the engagement portions 70, it is possible to integrally rotate the first rotational shaft 42 and the second input side rotating body 52. Accordingly, the rotational speed of the first rotational shaft 42 is changed according to the ratio of the total number of teeth of the gear 52A of the second input side rotating body 52 relative to the total number of teeth of the gear 56A of the second output side rotating body 56. Since the total number of teeth of the gear 52A is equal to or less than the total number of teeth of the gear 56A, the rotation of the first rotational shaft 42 is transmitted to the second output side rotating body 56 at a constant speed or after being decelerated. Additionally, the ratio of the rotational speed of the first output side rotating body 54 relative to the rotational speed of the first input side rotating body 50 is greater than the ratio of the rotational speed of the second output side rotating body 56 relative to the rotational speed of the second input side rotating body 52. Accordingly, when in the first state shown in FIG. 2, the rotation of the first rotational shaft 42 is decelerated more than when in the second state shown in FIG. 3 and transmitted to the first output side rotating body 54 and the second output side rotating body 56.

The drive unit 30 further comprises a torque sensor 82 and a rotational speed sensor (not shown). The torque sensor 82 is, for example, a strain gauge, a semiconductor strain sensor, or a magnetostrictive sensor. The torque sensor 82 is attached to the output unit 58. The torque sensor 82 is configured to detect torque that is applied to the output unit 58.

When the rotation of the crankshaft 32 is transmitted to the output unit 58 and the rotation of the motor 38 is not transmitted to the output unit 58, the torque sensor 82 outputs a signal to the controller 46 that reflects the manual drive force that is inputted to the crankshaft 32. When the rotation of the crankshaft 32 and the rotation of the motor 38 are transmitted to the output unit 58, the torque sensor 82 outputs a signal to the controller 46 that reflects the torque obtained by combining the manual drive force that is inputted to the crankshaft 32 and the torque of the motor 38 transmitted via the transmission 36.

The rotational speed sensor comprises a cadence sensor that detects the rotational speed of the crank. The cadence sensor detects, for example, a magnet that is provided on the crankshaft 32. The cadence sensor comprises a magnetism detection sensor, such as a reed switch or a Hall Effect element. The cadence sensor outputs a signal corresponding to the rotational speed of the crankshaft 32 to the controller 46. The cadence sensor can also be configured to detect a magnet that is provided to the crank arms 12. In this case, the cadence sensor outputs a signal to the controller 46 corresponding to the rotational speed of the crank arms 12. The rotational speed sensor can further comprise a speed sensor that detects the rotational speed of the front wheel or the rear wheel of the electrically assisted bicycle 10. The controller 46 is programmed to calculate the rotational speed of the crank based on the detection result of the rotational speed sensor.

The controller 46 controls the motor 38 and the shifting motor 78. The controller 46 controls the rotation of the motor 38 and the rotation of the shifting motor 78 according to the manual drive force and the rotational speed of the crankshaft 32. In one example, the controller 46 controls the outputs of the motor 38 and the shifting motor 78 based on the manual drive force that is detected by the torque sensor 82, and the travel speed of the electrically assisted bicycle 10 that is detected by the rotational speed sensor.

When the rotational speed of the crank becomes higher than a predetermined speed from equal to or less than the predetermined speed, the controller 46 drives the shifting motor 78 to engage the first rotational shaft 42 with the second output side rotating body 56. When the rotational speed of the crank becomes lower than a predetermined speed from equal to or greater than the predetermined speed, the controller 46 drives the shifting motor 78 to release the engagement of the first rotational shaft 42 and the second output side rotating body 56. Accordingly, the ratio of the rotational speed of the output unit 58 relative to the rotational speed of the first rotational shaft 42 becomes relatively large in the region in which the rotational speed of the crank is high, and the ratio of the rotational speed of the output unit 58 relative to the rotational speed of the first rotational shaft 42 becomes relatively small in the region in which the rotational speed of the crank is low.

The rotation, the speed of which is changed by the transmission 36, is transmitted to the output unit 58. That is, the torque of the motor 38 and the torque of the crankshaft 32 are combined in the output unit 58. By such a configuration, only the torque of the motor 38 is transmitted from the first input side rotating body 50 and the second input side rotating body 52 to the output unit 58, and the torque that is output from the output unit 58 is joined with the manual drive force in a transmission path of the drive force from the output unit 58 to a wheel (not shown) that is connected to the rear sprocket 20 (refer to FIG. 1). The output unit 58 is configured to receive only torque from the motor via the first input side rotating body 50 and the second input side rotating body 52. The first input side rotating body 50 and the second input side rotating body 52 are configured to transmit only torque from the motor 38 to the output unit 58. The rotation of the transmission 36 is transmitted to the front sprocket 18, and the rotation of the crankshaft 32 is applied thereto without interposing the transmission 36.

The action and effects of the drive unit 30 will be described.

(1) The drive unit 30 comprises the transmission 36 that changes the rotational speed of the motor 38 and transmits the rotation of the motor 38 to the output unit 58. It is possible to change the transmission ratio of the transmission 36 by driving the shifting motor 78. According to this configuration, it becomes easy to suppress the rotational speed of the motor 38 to within a prescribed range; therefore, it is possible to prevent a reduction in the assisting force accompanying a. change in the rotational speed of the crank.

(2) The motor 38 is partially disposed on the same plane as the first input side rotating body 50 and the second input side rotating body 52, wherein the plane is perpendicular to the first a rotational axis CA and the second rotational axis CB. Accordingly, the size of the drive unit 30 in the axial direction of the crankshaft 32 can be reduced.

(3) The switching mechanism 60 comprises the one-way clutch 64. Therefore, the configuration of the drive unit 30 can be simplified, compared to a case in which a connection switching unit 62 is provided between the first input side rotating body 50 and the first output side rotating body 54, in the same manner as the second input side rotating body 52 and the second output side rotating body 56.

MODIFICATIONS

The descriptions relating to the embodiment described above are examples of forms that the bicycle drive unit according to the present invention can take and are not intended to limit the forms thereof. The bicycle drive unit according to the present invention can take the forms of modifications of the above-described embodiment shown below, as well as forms that combine at least two modifications that are not mutually contradictory.

Figure 4:
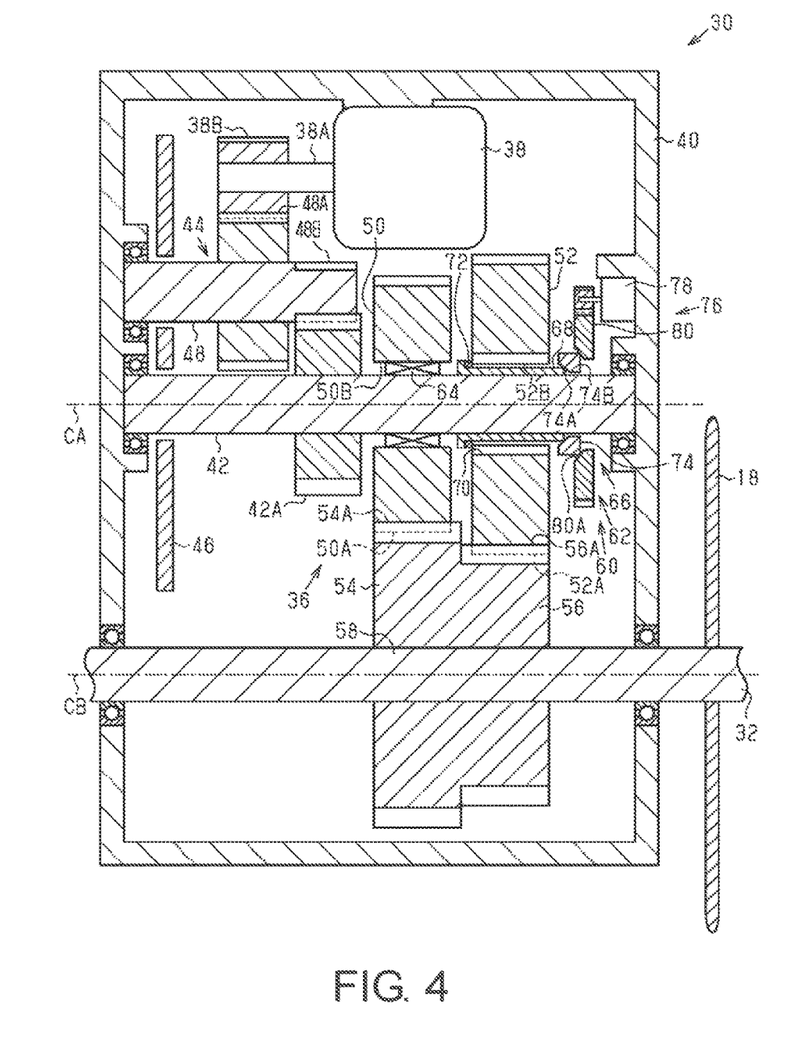
FIG. 4 is a cross-sectional view of the bicycle drive unit in accordance with one modification.

The configuration of the drive unit 30 of the embodiment can be freely changed, as shown in, for example, FIG. 4. in the drive unit 30 of FIG. 4, the output unit 58 is formed by the crankshaft 32. In this configuration as well, only the torque of the motor 38 is transmitted from the first input side rotating body 50 and the second input side rotating body 52 to the output unit 58, and the torque that is output from the output unit 58 is joined with the manual drive force in a transmission path of the drive force from the output unit 58 to a wheel (not shown) that is connected to the rear sprocket 20 (refer to FIG. 1).

The pawls 68 of the switching mechanism 60 of the embodiment can be allowed to protrude from the second input side rotating body. In this case, the engagement portions 70 are provided so that the pawls 68 are hooked on the first rotational shaft 42.

The motor 38 of the embodiment can be disposed so as to not be on the same plane as the first input side rotating body 50 and the second input side rotating body 52, wherein the plane is perpendicular to the first rotational axis CA and the second rotational axis CB. For example, the motor 38 can be disposed so that the entire structure of the motor 38 will be farther from the front sprocket 18 than the first input side rotating body 50 with respect to the axial direction of the crankshaft 32 in FIG. 2.

The transmission 36 having three or more gear shift stages can be provided in the drive unit 30 of the embodiment. For example, a third input side rotating body is provided around the first rotational axis CA, and a third output side rotating body is provided around the second rotational axis CB. In this case, the switching mechanism 60 is configured to switch between a third state in which the first rotational shaft 42 and the third input side rotating body are integrally rotatable, and a fourth state in which the first rotational shaft 42 and the third input side rotating body are relatively rotatable.

The total number of teeth of the gear 52A of the second input side rotating body 52 of the embodiment can be greater than the total number of teeth of the gear 56A of the second output side rotating body 56. In this case, when the first rotational shaft 42 and the second output side rotating body 56 are integrally rotated, the rotation of the first rotational shaft 42 is accelerated and inputted to the second output side rotating body 56.

In the above-described modification, the total number of teeth of the gear 50A of the first input side rotating body 50 can be less than or equal to the total number of teeth of the gear 54A of the first output side rotating body 54. In this case, when the first rotational shaft 42 and the second input side rotating body 52 are relatively rotated, the rotation of the first rotational shaft 42 is kept constant or accelerated, and inputted to the first output side rotating body 54.

The first output side rotating body 54 and the second output side rotating body 56 of the embodiment can be separately formed and each separately provided on the output unit 58.

In the above-described modification, the switching mechanism 60 can be provided between the output unit 58, and the first output side rotating body 54 and the second output side rotating body 56. In this case, the first input side rotating body 50 and the second input side rotating body 52 are fixed to the first rotational shaft 42, and the first output side rotating body 54 and the second output side rotating body 56 are provided on the output unit 58 so as to be relatively rotatable. If the first input side rotating body 50 and the second input side rotating body 52 are fixed to the first rotational shaft 42, the motor 38 or the speed reducer 44 can transmit torque to the teeth of a gear that forms the first input side rotating body 50, or to the teeth of a gear that forms the second input side rotating body 52.

In the drive unit 30 of the embodiment, the torque sensor 82 can be attached to the crankshaft 32.

In the speed reducer 44 of the embodiment, a third rotational shaft that reduces the rotational speed of the second rotational shaft 48 and transmits the rotation of the second rotational shaft 48 to the first rotational shaft 42 can be provided between the second rotational shaft 48 and the first rotational shaft 42. That is, three or more stages of deceleration can be carried out in the speed reducer 44.

In the drive unit 30 of the embodiment, a one-way clutch can be provided in a transmission path between the motor 38 and the transmission 36.

The drive unit 30 of the embodiment can take a form that does not comprise the crankshaft 32. In this case, the crankshaft 32 as a component of the bicycle is connected to the drive unit 30.

The drive unit 30 of the embodiment can take a form that does not comprise the speed reducer 44. In this case, for example, the gear 42A of the first rotational shaft 42 and the gear 38B of the output shaft 38A of the motor 38 can be engaged.

The position in which the drive unit 30 is provided can be freely changed. In one example, the drive unit 30 can be provided in the vicinity of the rear sprocket 20. In this case, it is possible to configure the rear wheel hub shell as the coupling member. The transmission 36 is coupled to the rear wheel hub shell. The rotation of the crankshaft 32 is transmitted to the rear wheel hub shell via the rear sprocket 20. Accordingly, the rotation of the transmission 36 is transmitted to the rear wheel hub shell, and the rotation of the crankshaft 32 is applied thereto without interposing the transmission 36.

In the embodiment, the second clutch 34 can be omitted.

In the embodiment, the controller 46 can be provided outside of the housing 40, or be provided on the frame of the electrically assisted bicycle 10.

In the embodiment, the shifting motor 78 can be omitted. In this case, an operating lever that can be operated by a rider, and an annular member 80 of the drive unit 76 can be connected by a wire.

In each embodiment, the torque sensor 82 can be configured to be disposed between a portion of the output unit 58 that is coupled to the crankshaft 32 via the second clutch 34, and the portion where the first output side rotating body 54 and the second output side rotating body 56 are connected. In this case, the torque sensor 82 is able to detect only the manual drive force, even when the motor 38 being driven.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section,"

"portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle drive unit comprising:
a transmission having a plurality of gear shift stages; and
a motor configured to transmit torque to the transmission,
the transmission comprises
    a first input side rotating body and a second input side rotating body rotatably disposed around a first rotational axis;
    a first output side rotating body rotatably disposed around a second rotational axis that is parallel to the first rotational axis, and coupled to the first input side rotating body;
    a second output side rotating body rotatably disposed around the second rotational axis and coupled to the second input side rotating body;
    an output unit configured to receive rotation of the first output side rotating body and the second output side rotating body; and
    a switching mechanism configured to switch between a first state in which the rotation of the first input side rotating body is transmitted to the output unit, and a second state in which the rotation of the second input side rotating body is transmitted to the output unit;
the output unit being configured to receive only torque from the motor via the first input side rotating body and the second input side rotating body, and
the output unit being configured such that torque outputted from the output unit merges with a manual drive force in a drive force transmission path from the output unit to a wheel.

2. The bicycle drive unit according to claim 1, wherein the output unit includes a crankshaft.

3. The bicycle drive unit according to claim 1, wherein the output unit includes a hollow shaft configured to receive a crankshaft therein.

4. The bicycle drive unit according to claim 3, further comprising
the crankshaft being coupled to the hollow shaft of the output unit.

5. The bicycle drive unit according to claim 1, wherein
the first input side rotating body and the second input side rotating body are gears having different diameters;
the first output side rotating body is a gear that is engaged with the first input side rotating body; and
the second output side rotating body is a gear that is engaged with the second input side rotating body.

6. The bicycle drive unit according to claim 1, further comprising
a first rotational shaft that rotates on the first rotational axis, the first output side rotating body and the second output side rotating body being fixed to the output unit; and
the switching mechanism integrally rotating the first rotational shaft and the first input side rotating body together as a unit and rotating the first rotational shaft relative to the second input side rotating body while the switching mechanism is in the first state, and
the switching mechanism integrally rotates the first rotational shaft and the second input side rotating body together as a unit and rotating the first rotational shaft relative to the first input side rotating body while the switching mechanism is in the second state.

7. The bicycle drive unit according to claim 6, wherein
a rotational speed ratio of the first output side rotating body with respect to a rotational speed of the first input side rotating body is configured to be smaller than a rotational speed ratio of the second output side rotating body with respect to a rotational speed of the second input side rotating body; and
the switching mechanism comprises:
    a connection switching unit configured to couple the first rotational shaft and the second input side rotating body while the switching mechanism is in the first state and allow a relative rotation between the first rotational shaft and the second input side rotating body while the switching mechanism is in the second state, and
    a one-way clutch disposed between the first rotational shaft and the first input side rotating body.

8. The bicycle drive unit according to claim 7, wherein the one-way clutch is configured to integrally rotate the first rotational shaft and the first input side rotating body while the rotational speed of the first input side rotating body in a first rotational direction is equal to the rotational speed of the first rotational shaft, and the one-way clutch is configured to rotate the first rotational shaft relative to the first input side rotating body while the rotational speed of the first input side rotating body in the first rotational direction is greater than the rotational speed of the first rotational shaft.

9. The bicycle drive unit according to claim 7, wherein the connection switching unit comprises a pawl provided on and protruding from one of the first rotational shaft and the second input side rotating body, and an engagement portion provided to the other of the first rotational shaft and the second input side rotating body so that the pawl is configured to selectively engage the engagement portion, and the first rotational shaft and the second input side rotating body are coupled by the pawl engaging the engagement portion, and permitting rotation of the first rotational shaft with respect to the second input side rotating body by disengaging the pawl from the engagement portion.

10. The bicycle drive unit according to claim 7, wherein the switching mechanism further comprises an actuator configured to control the connection switching unit.

11. The bicycle drive unit according to claim 10, wherein the connection switching unit comprises a pawl provided on and protruding from one of the first rotational shaft and the second input side rotating body, and an engagement portion provided to the other of the first rotational shaft and the second input side rotating body so that the pawl is configured to selectively engage the engagement portion, the first rotational shaft and the second input side rotating body are coupled by the pawl engaging the engagement portion, and permitting rotation of the first rotational shaft with respect to the second input side rotating body by disengaging the pawl from the engagement portion, and the actuator comprises a biasing member that applies force to the pawl so that the pawl projects from one of the first rotational shaft and the second input side rotating body; a movable member that is configured to cause the pawl to operate with respect to the other of the first rotational shaft and the second input side rotating body so that the pawl moves away from the engagement portion; and a drive unit that switches between the first state and the second state by moving the movable member.

12. The bicycle drive unit according to claim 6, wherein the first rotational shaft is inserted in holes provided in each of the first input side rotating body and the second input side rotating body.

13. The bicycle drive unit according to claim 12, wherein the connection switching unit comprises a pawl provided on and protruding from one of the first rotational shaft and the second input side rotating body, and an engagement portion provided to the other of the first rotational shaft and the second input side rotating body so that the pawl is configured to selectively engage the engagement portion, the first rotational shaft and the second input side rotating body are coupled by the pawl engaging the engagement portion, and permitting rotation of the first rotational shaft with respect to the second input side rotating body by disengaging the pawl from the engagement portion, and the pawl is disposed between an outer perimeter of the first rotational shaft and an inner perimeter of the second input side rotating body.

14. The bicycle drive unit according to claim 1, further comprising a speed reducer configured to reduce a rotational speed of the motor and transmit a rotation of the motor to the transmission.

15. The bicycle drive unit according to claim 1, wherein the motor is partially disposed on a plane that includes at least one of the first input side rotating body and the second input side rotating body, the plane being perpendicular to the first rotational axis and the second rotational axis.

16. The bicycle drive unit according to claim 1, wherein the first output side rotating body and the second output side rotating body are integrally fanned together as a unit.

* * * * *